US011211180B2

(12) United States Patent
Sharpless et al.

(10) Patent No.: US 11,211,180 B2
(45) Date of Patent: Dec. 28, 2021

(54) ANTI-SCATTER GRID DEVICE AND METHOD FOR MAKING THE SAME

(71) Applicant: SHANGHAI UNITED IMAGING HEALTHCARE CO., LTD., Shanghai (CN)

(72) Inventors: Ronald Sharpless, Houston, TX (US); Patrick Kling, Houston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 338 days.

(21) Appl. No.: 15/581,089

(22) Filed: Apr. 28, 2017

(65) Prior Publication Data

US 2018/0315516 A1 Nov. 1, 2018

(51) Int. Cl.
*G21K 1/02* (2006.01)
*B29C 45/14* (2006.01)
*B29K 71/00* (2006.01)
*B29K 101/10* (2006.01)
*B29K 705/00* (2006.01)

(52) U.S. Cl.
CPC ........ *G21K 1/025* (2013.01); *B29C 45/14065* (2013.01); *B29C 45/14508* (2013.01); *B29C 2045/14122* (2013.01); *B29K 2071/00* (2013.01); *B29K 2101/10* (2013.01); *B29K 2705/00* (2013.01)

(58) Field of Classification Search
CPC .............. G21K 1/025; B29C 45/14508; B29C 45/14065; B29C 2045/14122; B29K 2705/00; B29K 2101/10
See application file for complete search history.

(56) References Cited

U.S. PATENT DOCUMENTS

| | | | |
|---|---|---|---|
| 6,470,072 B1 | 10/2002 | Johnson | |
| 6,980,629 B1 | 12/2005 | Hoheisel et al. | |
| 2006/0067479 A1* | 3/2006 | Freund | G21K 1/025 378/149 |
| 2008/0088059 A1* | 4/2008 | Tang | G21K 1/025 264/261 |
| 2009/0003530 A1 | 1/2009 | Van Vroonhoven | |

(Continued)

FOREIGN PATENT DOCUMENTS

| | | |
|---|---|---|
| DE | 102005028413 A1 | 12/2006 |
| JP | S5842986 A | 3/1983 |

OTHER PUBLICATIONS

Machine Translation of Description of DE 10 2005 028413 published Dec. 28, 2006 (Google/EPO version from ESPACENET).*

(Continued)

*Primary Examiner* — Cynthia L Schaller
(74) *Attorney, Agent, or Firm* — Metis IP LLC

(57) ABSTRACT

A system and method for making an anti-scatter grid device is provided. The method may include providing a mold including one or more orientation structures arranged in first positions. The method may also include placing a plurality of plates including a first material into at least one of the orientation structures, and injecting a second material into a first cavity in the mold formed by the plurality of plates and the orientation structures. The method may further include separating the plurality of plates and the hardened second material from the mold to generate a first module.

19 Claims, 13 Drawing Sheets

(56) References Cited

U.S. PATENT DOCUMENTS

| | | | | |
|---|---|---|---|---|
| 2011/0278463 A1* | 11/2011 | Miess | ................... | G21K 4/00 |
| | | | | 250/361 R |
| 2011/0317819 A1* | 12/2011 | Shaw | ................... | G21K 1/025 |
| | | | | 378/154 |
| 2013/0121475 A1* | 5/2013 | Deych | ................... | G21K 1/025 |
| | | | | 378/154 |
| 2018/0315516 A1 | 11/2018 | Sharpless et al. | | |

OTHER PUBLICATIONS

Search report in European Application No. 17178688.2 dated Feb. 15, 2018, 13 pages.
Wang Qingyi, Elimination of Scattered Rays, X-Ray Photography(3rd Edition), 1998, 9 pages.

* cited by examiner

ANTI-SCATTER GRID DEVICE AND METHOD FOR MAKING THE SAME

TECHNICAL FIELD

The present disclosure generally relates to imaging systems, and more particularly, to an anti-scatter grid device and methods for making the same.

BACKGROUND

Many scanners, such as computed tomography (CT) scanners and positron emission tomography (PET) scanners, use X-rays or other high-energy beams to inspect an object. These scanners might be used for medical applications (e.g. medical CT), industrial applications (e.g. inspection of weld joints), research (e.g. archeology), and security applications (e.g. airport screening). The high-energy beams used in such a scanner may traverse an object and may be detected by a detector of the scanner for generating an image of the object. Some of the high-energy beams may be deflected by the scanned object and influence image quality. Anti-scatter grids (ASGs) are widely used to limit the amount of radiation scatter created in such radiography processes. For example, an ASG can be placed in front of a detector to select only those beams which are not deflected and are then detected by a detector array. An anti-scatter grid is a geometric structure of highly absorbing materials (such as Tungsten or Lead) which is accurately positioned to absorb beams which do not come directly from the direction of the radiation source. Accordingly, it would be desirable to provide an ASG with an accurate geometric structure of highly absorbing materials.

SUMMARY

In accordance with some embodiments of the disclosed subject matter, an anti-scatter grid device and methods for making the anti-scatter grid device are provided.

In accordance with some embodiments of the disclosed subject matter, a method for making an anti-scatter grid device is provided. The method may include: providing a mold including one or more orientation structures arranged in first positions; placing a plurality of plates including a first material into at least one of the orientation structures, wherein the plurality of plates are constrained in second positions by the orientation structures; injecting a second material into a first cavity in the mold formed by the plurality of plates and the orientation structures; and separating the plurality of plates and the hardened second material from the mold to generate a first module. In some embodiments, the first material may be capable of absorbing a first amount of at least one type of radiation. The second material may be capable of absorbing a second amount of the at least one type of radiation. The first amount may be greater than the second amount.

In some embodiments, the first positions may correspond to an offset angle of at least one of the orientation structures relative to a path of the at least one type of radiation incident on the first module.

In some embodiments, the method may further include compensating at least one position change of an interspace between at least two of the orientation structures incurred by hardening of the second material.

In some embodiments, the orientation structures may include one or more slots.

In some embodiments, the second material may include resin.

In some embodiments, the second material may include a composite material. The composite material may include a third material that may be capable of absorbing a third amount of the at least one type of radiation. The first amount may be greater than the third amount.

In some embodiments, the third material may include fiber.

In some embodiments, the second material injected in the first cavity may form at least one surface of the first module.

In some embodiments, a layer may be added to a surface of the first module without the second material. The layer may include a fourth material that may be capable of absorbing a fourth amount of the at least one type of radiation. The first amount may be greater than the fourth amount.

In some embodiments, a second module may be generated. The second module may be bonded to the first module via at least one of the plurality of plates.

In some embodiments, the second material may be injected into a second cavity in the mold. The hardened second material in the second cavity may be located inside the first module.

In some embodiments, the mold may include one or more alignment structures. The alignment structures may form one or more alignment parts in the first module to connect the first module to a detector.

Another aspect of the present disclosure relates to a mold for fabricating an anti-scatter grid module. The mold may include one or more orientation structures arranged in first positions. The orientation structures may be configured to constrain a plurality of plates in second positions. The plurality of plates may include a first material that may be absorbing a first amount of at least one type of radiation. The mold may also include a first cavity for injection of a second material capable of absorbing a second amount of the at least one type of radiation. The first cavity may be formed by the plurality of plates and the orientation structures, and the first amount is greater than the second amount.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting examples, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
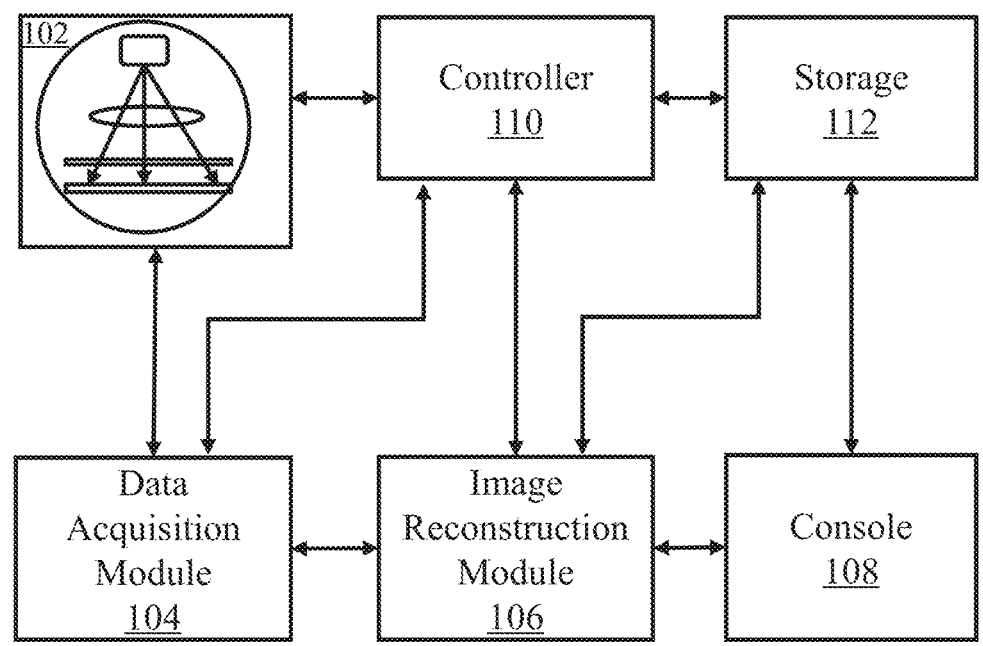
FIG. 1 is a schematic block diagram of an exemplary imaging system according to some embodiments of the present disclosure.

FIG. 1 is a schematic block diagram of an example 100 of an imaging system according to some embodiments of the present disclosure. As shown, the imaging system 100 may include a scanning apparatus 102, a data acquisition module 104, an image reconstruction module 106, a console 108, a controller 110, and a storage 112. It should be noted that the imaging system described below is merely provided for illustration purposes, and not intended to limit the scope of the present disclosure. The imaging system may find its applications in various fields, such as the healthcare industry (e.g., medical applications), security applications, industrial applications, etc. For example, the imaging system may be a computed tomography (CT) system, a digital radiography (DR) system, a positron emission tomography (PET) system, a single positron emission tomography (SPET) system, a multi-modality system, or the like, or a combination thereof. In some embodiments, the system 100 may be used for internal inspections of components including, e.g., flaw detection, security scanning, failure analysis, metrology, assembly analysis, void analysis, wall thickness analysis, or the like, or a combination thereof.

The scanning apparatus 102 may generate a signal by emitting radiation beams to an object. The scanning apparatus 102 may be a computed tomography (CT) scanner, a digital radiography (DR) scanner, a computed radiography (CR) scanner, a positron emission tomography (PET) scanner, a single positron emission tomography (SPET) scanner, a multi-modality scanner, or the like, or a combination thereof. Exemplary multi-modality scanner may include a computed tomography-positron emission tomography (CT-PET) scanner, a computed tomography-magnetic resonance imaging (CT-MRI) scanner, etc. The radiation may include a particle ray, a photon ray, or the like, or a combination thereof. The particle ray may include a beam of neutrons, a beam of protons (e.g., a α-ray), electron (e.g., a β-ray), a beam of μ-mesons, a beam of heavy ions, or the like, or a combination thereof. The photon ray may include an X-ray, a γ-ray, ultraviolet, laser, or the like, or a combination thereof. The object may include a substance, a tissue, an organ, a specimen, a body, a human being, or the like, or a combination thereof. The signal may be an optical signal such as a visible light signal containing characteristic information of the object, such as density, thickness, composition, etc. For example, a detector in the scanning apparatus 102 may detect radiation traversing an object and the detected radiation may excite a scintillating material on the detector to generate a visible light signal.

The data acquisition module 104 may obtain a signal generated by the scanning apparatus 102. In some embodiments, the signal may be a visible light signal converted by radiation beams traversing an object. In some embodiments, the data acquisition module 104 may include an optoelectronic conversion unit, an analog-digital converter (ADC), or the like, or a combination thereof. The optoelectronic conversion unit may convert the visible light signal into an electronic signal. It should be noted that, in some embodiments, the optoelectronic conversion unit may be integrated into the scanning apparatus 102. The analog-digital converter may convert the electronic signal into a digital signal, such as projected data indicative of the signal generated by the scanning apparatus 102. The projected data may be transmitted to the image reconstruction module 106.

The image reconstruction module 106 may generate an image based on data relating to an object obtained from the data acquisition module 104, or the storage 112. In some embodiments, the data relating to the object may include projected data corresponding to radiation beams traversing the object. In some embodiments, the image may be generated by using a suitable analytical, an iterative, and/or other reconstruction techniques. In some embodiments, the image reconstruction module 106 may be connected to or communicate with the data acquisition 104, the console 108, the controller 110, and the storage 112 via a wireless connection, a wired connection, or a combination thereof. In some embodiments, the image reconstruction module 106 may include a digital-analog converter (DAC) which may convert the image data into an analog signal. The analog signal may be processed and transmitted to the console 108 for display.

The console 108 may be a user interface through which a user or an operator may communicate with different components in the imaging system 100. In some embodiments, the console 108 may include an input device, a control panel, etc. The input device may include alphanumeric and other keys that may be input via a keyboard, a touch screen (for example, with a haptics or tactile feedback), a speech input, an eye tracking input, a brain monitoring system, or any other comparable input mechanism. The input device may also include, for example, a cursor control device, such as a mouse, a trackball, or cursor direction keys, etc. In some embodiments, the console 108 may display images generated by the image reconstruction module 106. In some embodiments, the console 108 may send a command or an instruction from a user or an operator to the image reconstruction module 106, and/or the controller 110. The console 108 may set one or more parameters for the imaging system 100, including acquisition parameters and/or reconstruction parameters. The acquisition parameters may relate to one or more conditions in obtaining scan data by, for example, scanning an object. The reconstruction parameters may relate to one or more conditions in reconstructing an image of the object. For example, the acquisition parameters may include a tube voltage, a tube current, recon parameters (e.g., a slice thickness), a scan time, a collimation/slice width, a beam filtration, a helical pitch, etc. The reconstruction parameters may include a reconstruction field of view (FOV), a reconstruction matrix, a convolution kernel/reconstruction filter, etc.

The controller 110 may control the scanning apparatus 102, the data acquisition module 104, the image reconstruction module 106, the console 108, and/or the storage 112. For example, the scanning apparatus 102 may be controlled by the controller 110 to rotate to a desired position that may be prescribed by a user via the console 108. The controller 110 may control the parameters of radiation beams, including the magnitude of radiation beams. As another example, the controller 110 may control the display of images on the console 108. In some embodiments, the controller 110 may control the data acquisition module 104 to acquire a signal generated from the scanning apparatus 102. Furthermore, the controller 110 may control the image reconstruction module 106 to generate an image based on data received from the data acquisition module 104.

In some embodiments, the controller 110 may include a processor, a processing core, a memory, or the like, or a combination thereof. Specifically, the controller 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a microcontroller unit, a microprocessor, an advanced RISC machines processor (ARM), or the like, or a combinations thereof.

The storage 112 may store data relating to the imaging system 100. The data may be a numerical value, an image, information of a subject, an instruction and/or a signal to operate the scanning apparatus 102, voice, a model relating to a patient, an algorithm relating to an image processing method, or the like, or a combination thereof. In some embodiments, the numerical value may include a threshold, a CT value, a value relating to an anti-scatter grid, or the like, or a combination thereof. The algorithm may include a series of image processing methods. The image may include a raw image or a processed image (e.g., an image after pretreatment). The model relating to a patient may include the background information of the patient, such as, ethnicity, citizenship, religion, gender, age, matrimony state, height, weight, medical history (e.g., history relating to different organs, or tissues), job, personal habits, or the like, or a combination thereof.

The storage 112 may include a random access memory (RAM), a read-only memory (ROM), or the like, or a combination thereof. The random access memory (RAM) may include a dekatron, a dynamic random access memory (DRAM), a static random access memory (SRAM), a thyristor random access memory (T-RAM), a zero capacitor random access memory (Z-RAM), or the like, or a combination thereof. The read only memory (ROM) may include a bubble memory, a magnetic button line memory, a memory thin film, a magnetic plate line memory, a core memory, a magnetic drum memory, a CD-ROM drive, a hard disk, a flash memory, or the like, or a combination thereof. In some embodiments, the storage module 112 may be a removable storage such as a U flash disk that may read data from and/or write data to the image reconstruction module 108 in a certain manner. The storage 112 may also include other similar means for providing computer programs or other instructions to operate the modules/units in the imaging system 100. In some embodiments, the storage 112 may be operationally connected with one or more virtual storage resources (e.g., a cloud storage, a virtual private network, other virtual storage resources, etc.) for transmitting or storing the data into the virtual storage resources.

In some embodiments, the imaging system 100 may be connected to a network (not shown in the figure). The network may be a local area network (LAN), a wide area network (WAN), a public network, a private network, a proprietary network, a public switched telephone network (PSTN), the Internet, a virtual network, a metropolitan area network, a telephone network, or the like, or a combination thereof. The connection between different components in the imaging system 100 may be wired or wireless. The wired connection may include using a metal cable, an optical cable, a hybrid cable, an interface, or the like, or a combination thereof. The wireless connection may include using a Wireless Local Area Network (WLAN), a Wireless Wide Area Network (WWAN), a Bluetooth, a ZigBee, a Near Field Communication (NFC), or the like, or a combination thereof.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 112 may be a database including cloud computing platforms, such as a public cloud, a private cloud, a community and hybrid clouds, etc. As another example, the data acquisition module 104 and the image reconstruction module 106 may be integrated into one single module. As a further example, the controller 110 and the storage 112 may be integrated into one module. However, those variations and modifications do not depart the scope of the present disclosure.

Figure 2:
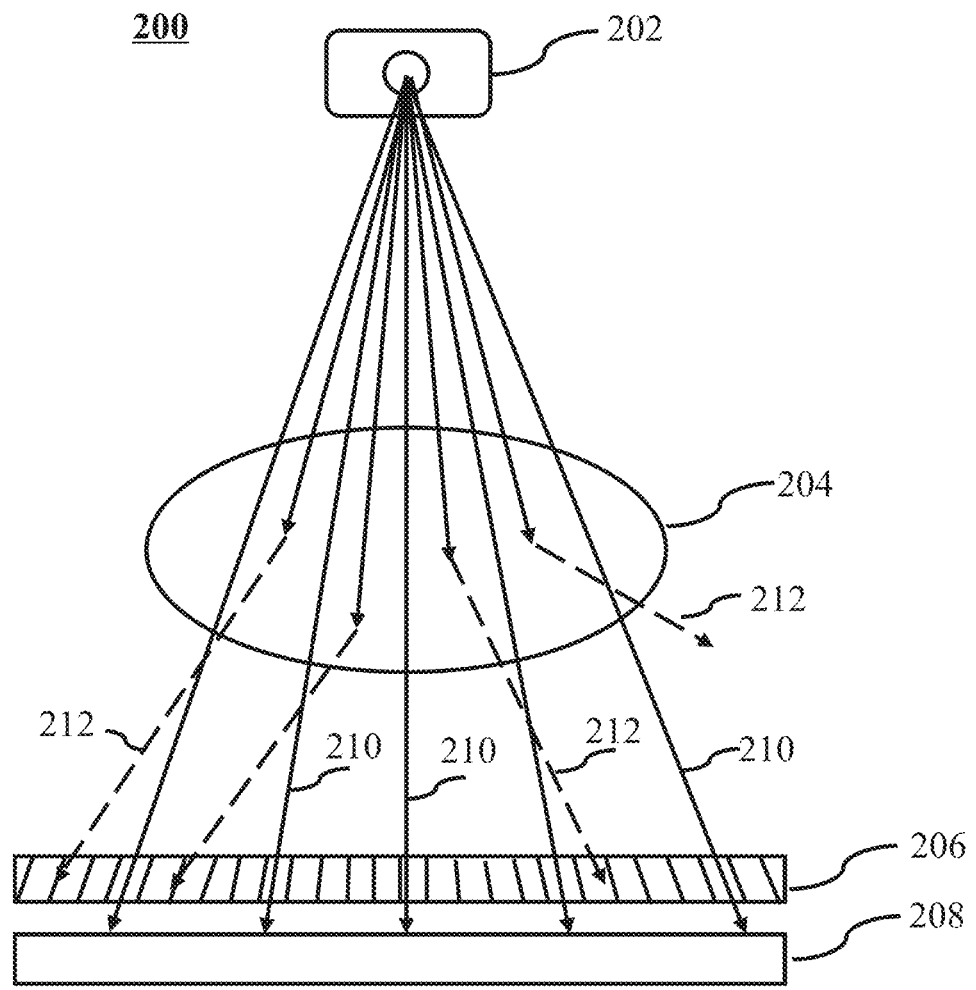
FIG. 2 is a schematic structure of a scanning apparatus according to some embodiments of the present disclosure.

FIG. 2 is a schematic structure of a scanning apparatus 200 according to some embodiments of the present disclosure. As shown, the scanning apparatus 200 may include a radiation source 202, an anti-scatter grid array 206, and a detector array 208.

The radiation source 202 may generate and emit one or more radiation beams traveling toward an object 204. The radiation beams may include, for example, one or more primary radiation beams 210 and secondary radiation beams 212 as shown in FIG. 2. The primary radiation beams 210 may include one or more radiation beams that travel along a substantially straight axis or direct trajectory path from the radiation source 202 to the detector array 208. The secondary radiation beams 212 may include one or more radiation beams that are scattered or deflected while traversing the object 204. The secondary radiation beams 212 can arrive at the detector array 208 at an angle relative to their original path(s) from the radiation source 202. In some embodiments, the secondary radiation beams 212 may also be referred to as scattered radiation beams. While the primary radiation beams 210 are useful for generating an image of the object 204 under examination, the secondary radiation beams 212 may cause artifacts in the image.

In some embodiments, the radiation source 202 may include a tube, such as a cold cathode ion tube, a high vacuum hot cathode tube, a rotating anode tube, etc. The tube may be powered by a high voltage generator, emitting the radiation beams that may be received by the detector array 208. The detector array 208 may receive the radiation beams passing through apertures in the scanning apparatus 200 defined by, for example, the anti-scatter grid array 206. Merely by way of example, the radiation beams may include a particle ray, a photon ray, or the like, or a combination thereof as described elsewhere in the disclosure. The object 204 may include a substance, a tissue, an organ, an object, a specimen, a body, a human being, or the like, or a combination thereof as described elsewhere in the disclosure. The shape of the radiation beams emitted by the radiation source 202 may be a line, a narrow pencil, a narrow fan, a fan, a cone, a wedge, an irregular shape, or the like, or a combination thereof.

The anti-scatter grid array 206 may absorb scattered radiation. For example, the anti-scatter grid array 206 can absorb one or more of the secondary radiation beams 212 and/or can alter directions of one or more of the secondary radiation beams 212, while allowing one or more of the primary radiation beams 210 to pass through the anti-scatter grid array 206. The types of radiation may include, for example, electromagnetic radiation, particle radiation, x-rays, gamma radiation, etc. The anti-scatter grid array 206 may include materials that can absorb one or more types of radiation (also referred to herein as the "highly absorbing materials"). For example, the highly absorbing materials may include tungsten, lead, uranium, gold, silver, copper, molybdenum, etc. The anti-scatter grid array 206 can also include materials that can allow one or more types of radiation to pass (also referred to herein as the "poorly absorbing materials"). In some embodiments, the poorly-absorbing materials may be non-absorbent of certain radiation (e.g., x-ray radiation) and/or allow passage of the radiation through the materials. In some embodiments, the poorly absorbing materials may be substantially non-absorbent of certain radiation. More particularly, for example, all or a certain amount of the radiation may pass through the poorly absorbing materials. Examples of the poorly absorbing materials may include resin, fiber, rubber, inorganic non-metallic material (e.g., ceramics), etc. The resin may include thermoplastic resin or thermosetting resin. The thermosetting resin may include phenolic resin, urea-formaldehyde resin, melamine-formaldehyde resin, epoxy resin, unsaturated resin, polyurethane, polyimide, etc. The thermoplastic resin may include polymethyl methacrylate (PMMA), acrylonitrile butadiene styrene (ABS), polyamide, polylactic acid (PLA), polybenzimidazole (PBI), polycarbonate (PC), polyethersulfone (PES), polyetheretherketone (PEEK), polyethylene (PE), polyphenylene oxide (PPO), polyphenylene sulfide (PPS), polypropylene (PP), polystyrene (PS), polyvinyl chloride (PVC), etc. The fiber may include inorganic fiber and organic fiber. Inorganic fiber may include glass fiber, carbon fiber, boron fiber, whisker, asbestos fiber, silicon carbide fiber, etc. Organic fiber may include synthetic fiber such as aramid fiber, aramid fiber, polyester fiber, nylon fiber, vinylon fiber, polypropylene fiber, polyimide fibers, etc., and natural fiber such as cotton, sisal, paper, etc. The rubber may include butyl rubber, chlorinated rubber, nitrile rubber, etc.

In some embodiments, the poorly absorbing materials may be composite materials containing fibers such as resin-based composite material, rubber-based composite material, etc.

A highly absorbing material and a poorly absorbing material can absorb different amounts of certain radiation. For example, the highly absorbing material can absorb a greater amount of the radiation than the poorly absorbing material. The highly absorbing material(s) and the poorly absorbing material(s) may be positioned in the anti-scatter grid array 206 to absorb scattered radiation. For example, the highly absorbing materials and the poorly absorbing materials may be positioned parallel to and/or substantially parallel to paths of radiation beams from the radiation source 202 to the detector array 208. The highly absorbing materials may absorb the scatter radiation beams (e.g. the secondary radiation beams 212). The poorly absorbing materials may allow the primary radiation beams (e.g., the primary radiation beams 210) to traverse the anti-scatter grid array 206.

In some embodiments, the anti-scatter grid array 206 may be placed between the radiation source 202 and the detector array 208. In some embodiments, the anti-scatter array 206 may be coupled to the detector array 208. For example, the anti-scatter array 206 may be coupled to the detector array 208 by bonding, welding, etc. In some embodiments, one or more coupling structures may be used to connect the anti-scatter array 206 to the detector array 208 via one or more rivets, screws, bolts, pins joints, key joints, and/or any other coupling structure.

The shape of the anti-scatter grid array 206 may be flat, arc-shaped, circular, linear, or the like, or a combination thereof. The anti-scatter grid array 206 may be two-dimensional, or three-dimensional. Examples of the anti-scatter grid array 206 may include a focused grid (e.g., an arc-focused grid), a linear grid, a crossed grid, a parallel grid, or the like, or a combination thereof. In some embodiments, the anti-scatter grid array 206 may include a specific configuration defined by one or more parameters, such as a focal length, a grid ratio, a grid density, etc. For example, the plurality of highly absorbing materials mentioned above may be in shape of plates. The focal length may refer to a perpendicular distance from the focal point to the upper surface of the anti-scatter grid array 206. The focal point of the anti-scatter grid array 206 may be a point that the plurality of plates may be focused toward the radiation source 202. The highly absorbing materials in shape of plates may be placed at various positions based on the focal length of anti-scatter grid 206. In some embodiments, an offset angle corresponding to a plate may be determined. The offset angle may be set in a manner that one or more primary radiation beams 210 is not blocked by the plates, while one or more secondary radiation beams 212 may be blocked by the plates. The offset angle may be defined as an angle between a path of a primary radiation beam 210 emitted from the radiation source 202 and the normal line that is perpendicular to the upper surface of the anti-scatter grid 206. The grid ratio may be a ratio of the height of the plate to an interspace between adjacent plates.

In some embodiments, the anti-scatter grid array 206 may include one or more anti-scatter grid modules. Each anti-scatter grid module may be a focused grid, a rectilinear grid, a crossed grid, an arc grid, a parallel grid, or the like, or a combination thereof. Each anti-scatter grid module may be in a specific configuration defined by one or more parameters, including a focal length, a grid ratio, a grid density, etc. In some embodiments, the anti-scatter grid modules of the anti-scatter grid array 206 may have the same configuration defined by the same parameters. In some embodiments, at least some of the anti-scatter grid modules may be in different configurations defined by different parameters. In some embodiments, the anti-scatter grid modules may attach to each other by bonding, welding, etc. In some embodiments, one or more coupling structures may be used to connect the anti-scatter array 206 to the detector array 208 via one or more rivets, screws, bolts, pins joints, key joints, and/or any other coupling structure. In some embodiments, the anti-scatter grid array 206 can include one or more anti-scatter grid modules as described in connection with FIGS. 6, 7A, and 7B.

The detector array 208 may detect radiation beams traversing the object 204. In some embodiments, the detector array 208 may convert the radiation beams into a visible light signal. The detector array 208 may include one or more detector modules positioned to form an arcuate structure including a plurality of pixels and/or channels. The pixels may detect radiation beams to generate signals. The signals may be generated by respective pixels when the radiation beams are detected. The signals may include different attributes (e.g., a radiation amplitude). For example, a signal may include a lower radiation amplitude when a radiation beam is detected traversing a higher density tissue (e.g., a bone tissue).

The detector array 208 may have any suitable shape. For example, the shape of the detector array 208 may be flat, arc-shaped, circular, or the like, or a combination thereof. The fan angle of an arc-shaped detector array may have any suitable value. For example, the fan angle may be in the range from 0° to 360°, from 30° to 270°, from 45° to 300°, etc. In some embodiments, the fan angle of the arc-shaped detector may be above 30°. In some embodiments, the fan angle of the arc-shaped detector may be above 45°. In a specific example, the fan angle of the arc-shaped detector may be one of 45°, 60°, 75°, 90°, or 105°. The fan angle may be fixed or adjustable according to different conditions including, for example, a desired resolution of an image, the size of an image, the sensitivity of the detector, the stability of the detector, or the like, or a combination thereof. In some embodiments, the pixels of the detector array 208 may be the same as the number of the detector modules, e.g., the number of scintillators and/or photoelectric sensors, etc. The pixels may be arranged in a single row, two rows, or any other number of rows.

In some embodiments, the detector array 208 may include a scintillator layer that may absorb radiation beams, and emit a visible light that can be detected by an array of photodiodes. The array of photodiodes may convert the visible light into an electrical signal. In some embodiments, the radiation beams may be converted directly into an electrical signal by a suitable direct conversion material, such as amorphous selenium. In some embodiments, the detector array 208 may be and/or include a film-based detector.

In some embodiments, the primary radiation beams 210 that traverse the object 204 may be detected by the detector array 208. Targets within the object 204 may cause various numbers of radiation beams to traverse the object 204 (e.g., creating areas of high traversal and areas of low traversal within the object 204). For example, fewer radiation beams may traverse targets with a higher density and/or a higher atomic number (relative to densities and atomic numbers of other targets in the object 204). In this way, a bone may appear more prominent in an image than surrounding tissue (which may be virtually invisible), since tissue may be less dense than bone (e.g., more radiation traverses the tissue than the bone). The secondary radiation beams 212 (also referred to as the scattered radiation beams) may be absorbed by the anti-scatter grid array 206. In some embodiments, the secondary radiation beams 212 absorbed by the anti-scatter grid array 206 may not contribute to an image of the object 204.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the anti-scatter grid array 206 may be an integrated part of the detector array 208. However, those variations and modifications do not depart the scope of the present disclosure.

Figure 3A:
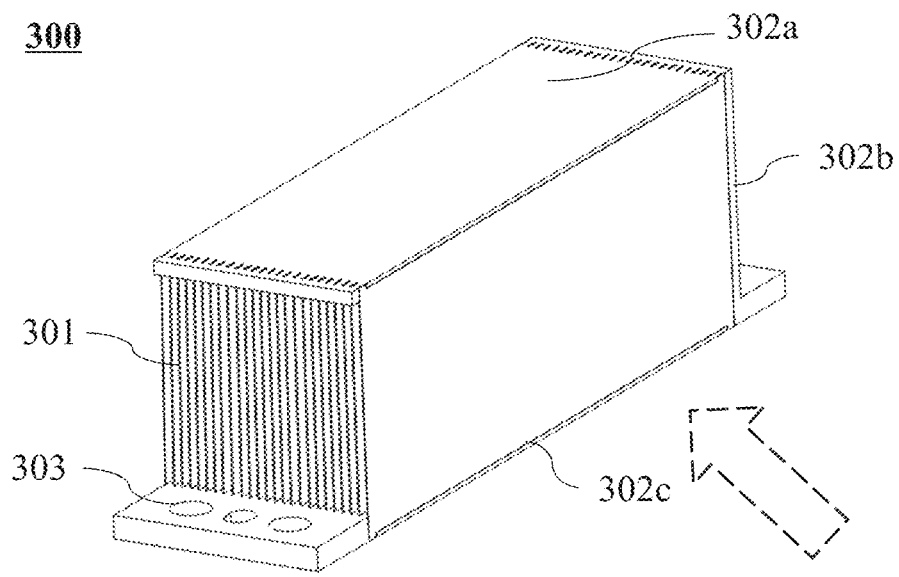
FIG. 3A illustrates a perspective view of an exemplary anti-scatter grid module according to some embodiments of the present disclosure.

FIG. 3A illustrates a perspective view of an exemplary anti-scatter grid module 300 according to some embodiments of the present disclosure. As shown, the anti-scatter grid module 300 may include one or more plates 301, a first board 302a, a second board 302b, a third board 302c, and a mounting part 303. In some embodiments, the first board 302a may be located at the top of the anti-scatter grid module 300. The second board 302b may be located at the back of the anti-scatter grid module 300. The third board 302c may be located at the bottom of the anti-scatter grid module 300.

In some embodiments, the plates 301 may include highly absorbing materials as described in connection with FIG. 2. In some embodiments, the plates 301 may be made of a polymer-based composite material including high-density particles of highly absorbing materials that can absorb radiation. In some embodiments, one or more of the plates 301 may be made of an alloy material including highly absorbing materials.

The plates 301 may be spaced by one or more interspaces. For example, two plates 301 may be spaced by an interspace. In some embodiments, an interspace between two adjacent plates may be filled with air. The interspace between two plates may be filled with a poorly absorbing material that can allow one or more types of radiation to pass. In some embodiments, the interspace between two plates may be partially filled with air and partially filled with poorly absorbing materials. In some embodiments, the plates 301 and the interspaces may include materials that can absorb different amounts of certain radiation. For example, the plates 301 and the interspaces may include a first material and a second material, respectively. The first material may absorb a greater amount of the radiation than the second material. In some embodiments, the first material can absorb a first amount of the radiation. The second material can absorb a second amount of the radiation. The first amount may be greater than the second amount. The first material may be a highly absorbing material. The second material may be a poorly absorbing material. In some embodiments, the plates 301 may be equally spaced.

The plates 301 may have any suitable shapes and/or dimensions. For example, the shape of the plates 301 may be a rectangle, a trapezoid, or any other irregular shape. The plates 301 may be arranged in a manner that each plate may correspond to an offset angle with respect to, for example, the third board 302c. In some embodiments, the plates may be parallel to and/or substantially parallel to each other. In some embodiments, each plate may be positioned according to an offset angle relative to a path of radiation beams emitted from a radiation source. For example, each plate may be adjusted according to the offset angle to be parallel to the primary radiation beams emitted from the radiation source.

The first board 302a, the second board 302b, and/or the third board 302c may include a poorly absorbing material that can allow one or more types of radiation to pass (e.g., X-rays, alpha rays, etc.). In some embodiments, the plates 301, the first board 302a, the second board 302b, and/or the third board 302c may include materials that can absorb different amounts of certain radiation. For example, the plates 301 may include a highly absorbing material (e.g., the first material that can absorb the first amount of the radiation). The first board 302a, the second board 302b, and/or the third board 302c may include the second material or any other poorly absorbing material that can absorb less radiation than the highly absorbing material (e.g., a third material that can absorb a third amount of the radiation, wherein the first amount is greater than the third amount).

In some embodiments, the first board 302a, the second board 302b, and the third board 302c may connect with and fix the plates 301 using an injection molding process. For example, during the injection molding process, a mold including one or more orientation structures may be provided. The plurality of plates may be placed into at least some of the orientation structures. Two adjacent orientation structures may constrain a plate in the mold. Then, a second material may be injected into the mold through an injection port. After the second material is hardened, the plurality of plates may be constrained in the mold by the orientation structures and/or the hardened second material. Then, the plates and the hardened second material may be separated from the orientation structures such that the hardened second material may substitute the orientation structures for fixing the plates.

All the plates may be fixed by the hardened second material in one operation. The constraint of the orientation structures may be maintained by the first board 302a, the second board 302b, and the third board 302c formed by the hardened second material after the mold is separated from the plates.

The mounting part 303 may be used to assemble the anti-scatter grid module 300 on a substrate (e.g., a substrate with a detector array) or with another anti-scatter grid module. In some embodiments, the mounting part 303 may include an alignment feature configured to align the anti-scatter grid module 300 with the detector array. For example, the alignment feature may include a hole. In some embodiments, the mounting part 303 may include at least one screw hole. In some embodiments, the mounting part 303 may include a rivet structure, a key joint, a pin joint, and/or any other coupling structure. In some embodiment, the mounting part 303 may be formed by an injection molding process as described elsewhere in the disclosure. In some embodiments, the mounting part 303 may be processed after the plates and the second hardened material are separated from the mold.

Figure 3B:
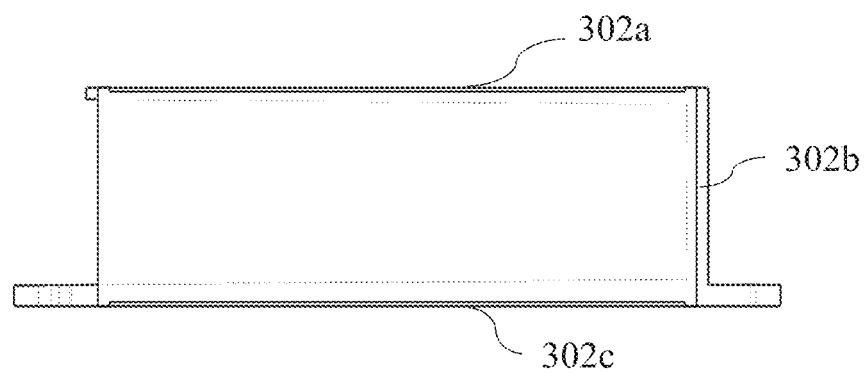
FIG. 3B illustrates a perspective view of the exemplary anti-scatter grid module in FIG. 3A according to some embodiments of the present disclosure.

FIG. 3B illustrates a perspective view of the exemplary anti-scatter grid module 300 shown in FIG. 3A according to some embodiments of the present disclosure. As illustrated in FIG. 3B, the first board 302a, the second board 302b, and the third board 302c may be integrated into one module based on one or more injection molding processes (e.g., such as one or more portions of process 600 of FIG. 6 and/or process 800 of FIG. 8). In some embodiments, the third board 302c may be omitted from the anti-scatter grid module 300. In some embodiments, the first board 302a may attach to the anti-scatter grid module 300 by bonding, welding, etc. In some embodiments, the first board 302a and the anti-scatter grid module 300 may be connected using any suitable coupling structure, such as one or more rivets, screws, bolts, pins joints, key joints, and/or any other coupling structure.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the mounting part 303 may be added after the second material hardening. However, those variations and modifications do not depart the scope of the present disclosure.

Figure 4A:
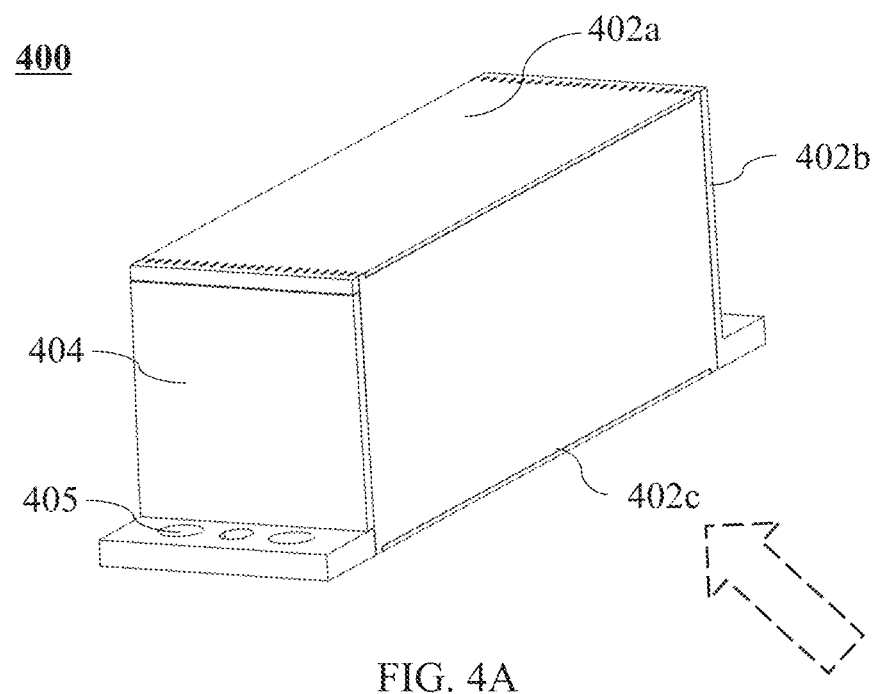
FIG. 4A illustrates a perspective view of another exemplary anti-scatter grid module according to some embodiments of the present disclosure.

FIG. 4A illustrates a perspective view of another exemplary anti-scatter grid module 400 according to some embodiments of the present disclosure. As shown, the anti-scatter grid module may include a first board 402a, a second board 402b, a third board 402c, a fourth board 404, and a mounting part 405. The anti-scatter grid module 400 may also include one or more plates not shown in the figure. The plates may be and/or include one or more plates 301 as described in connection with FIG. 3A above. The first board 402a, the second board 402b, the third board 402c, and/or the fourth board 404 may include a poorly absorbing material that can allow one or more types of radiation to pass (e.g., X-rays, alpha rays, etc.).

In some embodiments, the plates and the fourth board 404 may include materials that can absorb different amounts of certain radiation. For example, the plates may include a highly absorbing material (e.g., a first material that can absorb a first amount of the radiation). The fourth board 404 may include a second material, a third material, or any other poorly absorbing material that can absorb less radiation than the highly absorbing material (e.g., a fourth material that can absorb a fourth amount of the radiation, wherein the first amount is greater than the fourth amount).

In some embodiments, the first board 402a, the second board 402b, the third board 402c and the fourth board 404 may include the same material. For example, the first board 402a, the second board 402b, the third board 402c and the fourth board 404 may include a second material as described in connection with FIG. 3A. In some embodiments, the first board 402a, the second board 402b, the third board 402c and the fourth board 404 may include different materials. For example, the first board 402a, the second board 402b, and the third board 402c may include the second material absorb a second amount of the radiation, and the fourth board 404 may include the fourth material that can absorb the fourth amount of the radiation. In some embodiments, the second amount may be the same with or different from the fourth amount.

In some embodiments, the first board 402a, the second board 402b, the third board 402c, and/or the fourth board 404 may be fabricated by an injection molding process as described elsewhere in the disclosure. In some embodiments, the fourth board 404 may be added to a front surface defined by the plurality of plates after the first board 402a, the second board 402b, and/or the third board 402c formed based on the injection molding process. In some embodiments, the fourth board 404 may attach to the anti-scatter grid module 400 by bonding, welding, etc. In some embodiments, the fourth board 404 and the anti-scatter grid module 400 can be connected by, for example, one or more rivets, screws, bolts, pins joints, key joints, and/or any other coupling structure. In some embodiments, the fourth board 404 may be configured to support the anti-scatter grid module 400.

The mounting part 405 may connect the anti-scatter grid module 400 with a detector array as described in FIG. 3A.

Figure 4B:
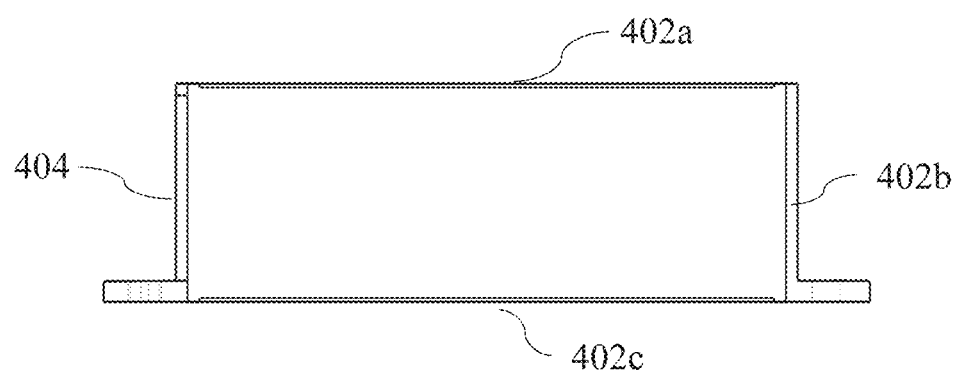
FIG. 4B illustrates a section view of the exemplary anti-scatter grid module in FIG. 4A according to some embodiments of the present disclosure.

FIG. 4B illustrates a section view of the exemplary anti-scatter grid module 400 in FIG. 4A according to some embodiments of the present disclosure. As shown, the 402a, the 402b, and the 402c may be integrated as a whole into one module based on one or more operations. The fourth board 404 may be connected to the anti-scatter module 400 after the first board 402a, the second board 402b, and the third board 402c are integrated. For example, the first board 402a may attach to the anti-scatter grid module 400 by bonding, welding, etc.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the first board 402a and/or the third board 402c may be located inside of the anti-scatter grid module 400. However, those variations and modifications do not depart the scope of the present disclosure.

Figure 5A:
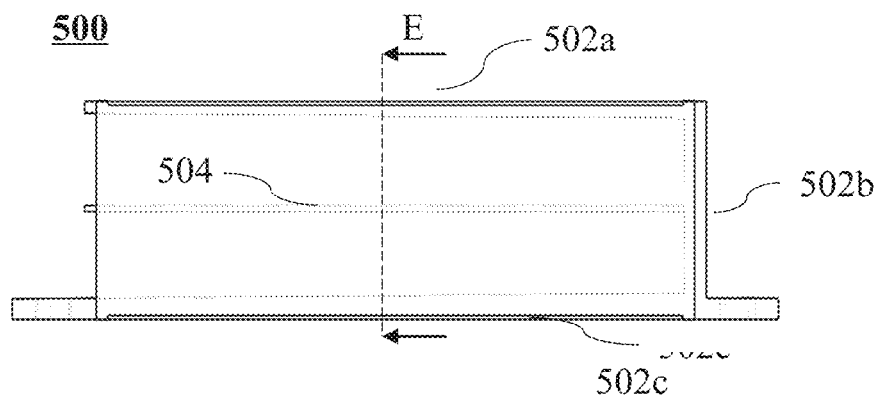
FIG. 5A illustrates a section view of another exemplary anti-scatter grid module according to some embodiments of the present disclosure.

FIG. 5A illustrates a section view of another exemplary anti-scatter grid module 500 according to some embodiments of the present disclosure. As shown, the anti-scatter grid module 500 may include a first board 502a, a second board 502b, a third board 502c, and/or an interlayer board 504. The anti-scatter grid module 500 may also include one or more plates 301 as described in connection with FIG. 3A above. The first board 502a, the second board 502b, the third board 502c and the interlayer board 504 may be formed based on an injection molding process in one operation as described elsewhere in the disclosure. For example, the shape of the first board 502a, the second board 502b, the third board 502c and/or the interlayer board 504 may be determined by the configuration of the orientation structures as described elsewhere in the disclosure. In some embodiments, the interlayer board 504 may be coupled to the anti-scatter grid module 500 after the first board 502a, the second board 502b, and the third board 502c are formed based on an injection molding process. For example, the interlayer board 504 may connect to the anti-scatter grid module 500 by bonding, welding, etc. In some embodiments, the interlayer board 504 and the anti-scatter grid module 500 may be connected by, for example, one or more rivets, screws, bolts, pins joints, key joints, and/or any other coupling structure.

The first board 502a, the second board 502b, the third board 502c and the interlayer board 504 may include a poorly absorbing material as described elsewhere in the disclosure. In some embodiments, the first board 502a, the second board 502b, the third board 502c and the interlayer board 504 may include the same material. For example, the first board 502a, the second board 502b, the third board 502c and the interlayer board 504 may include the second material, the third material, the fourth material, and/or any other poorly absorbing material. In some embodiments, the first board 502a, the second board 502b, the third board 502c, and the interlayer board 504 may include different materials. For example, the first board 502a, the second board 502b, and the third board 502c may include the second material, and the interlayer board 504 may include a fifth material that can absorb less amount of radiation than the highly absorbing material.

In some embodiments, the interlayer board 504 may be in different shapes, such as a rectangle, trapezoid, or other irregular shapes. In some embodiments, the interlayer board 504 may intersect with all the plates. In some embodiments, the interlayer board 504 may intersect with a portion of the plates.

Figure 5B:
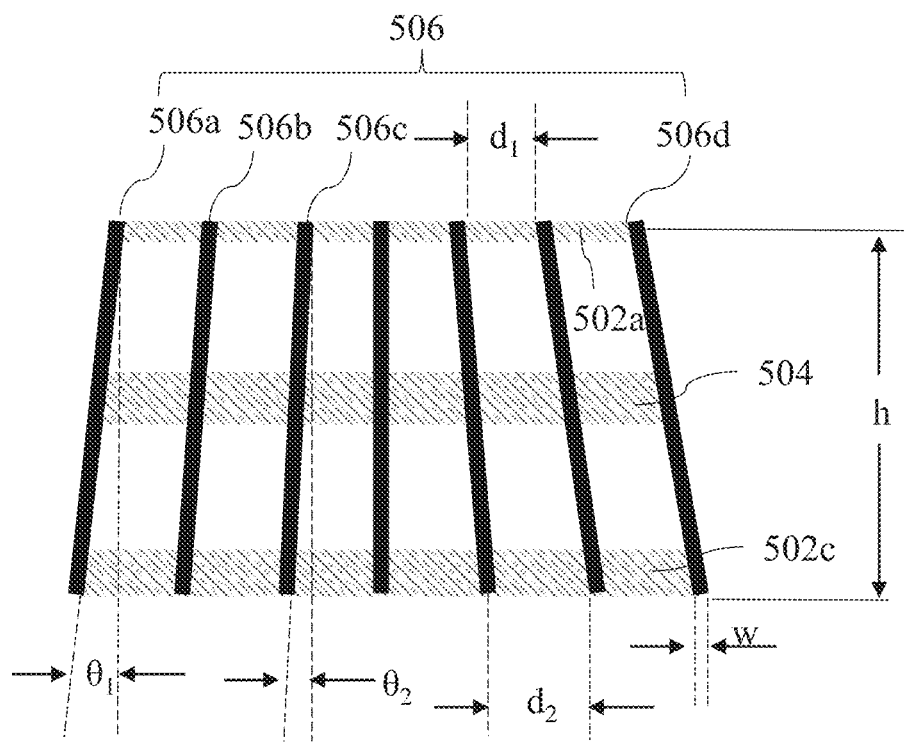
FIG. 5B illustrates a section view in E direction of the exemplary anti-scatter grid module in FIG. 5A according to some embodiments of the present disclosure.

FIG. 5B illustrates a section view in E direction of the exemplary anti-scatter grid module 500 in FIG. 5A according to some embodiments of the present disclosure. As shown, the E direction is parallel to the first board 502a and perpendicular to the second board 502b. In some embodiments, the E direction is perpendicular to at least one radiation beam incident on the anti-scatter grid module (e.g., the central primary radiation beam 210 as illustrated in FIG. 2). The anti-scatter grid module 500 may include one or more plates 506 (e.g. 506a, 506b, 506c) as described in connection with FIG. 3A. The anti-scatter grid module may be in a specific configuration defined by one or more parameters including a width w, a height h, an offset angle θ, an interspace d, a distribution density of the plurality of plates, etc. The distribution density of the plates may be in a range from about 20/cm to about 100/cm. In some embodiments, the anti-scatter grid module may include a focused grid, a parallel grid, etc.

The height of the plates h may be the same with the height of the anti-scatter grid module and may be about 1 mm or any other suitable height. In some embodiments, the height of the plates h may be lower than the height of the anti-scatter grid module 500. In some embodiments, the width w of the plates (e.g., 506a, 506b, 506c, etc.) may or may not be the same. The width w may be in a range from about 5 μm to about 10 μm. In some embodiments, the width w of the plates may be in a range from about 10 μm to about 20 μm. In some embodiments, the width w of the plates may be in a range from about 20 μm to about 30 μm.

The plates 506 may be arranged in a manner that each plate may correspond to an angle with respect to, for example, third board 502c or a vertical line. In order to allow the primary radiation beams as described elsewhere in the disclosure to pass, an offset angle may be applied to each plate. The offset angle may relate to the path of radiation beams emitted from a radiation source (e.g., the radiation source 202 as shown in FIG. 2). In some embodiments, each of the plates may be in different offset angles, for example, the offset angle $θ_1$ of the plate 506a may be greater than the offset angle $θ_2$ of the plate 506c. In some embodiments, each of the plates may have the same offset angle in an anti-scatter grid module, for example, the offset angle of the plates may be zero degrees in a parallel anti-scatter grid.

The offset angle θ may be in a range from any suitable angle (e.g., 15 degrees, etc.) to 0 degree. The offset angle θ of the plurality of plates may vary depending on the geometry of the imaging system (e.g., the location of the radiation source with respect to the anti-scatter grid module array or the shape of the radiation source). For example, in a cone-shaped radiation source, the center of the anti-scatter grid module 500 may include a plate with an offset angle that is about 0 degree. As another example, in the mammographic imaging system, at least one of the edge regions of the anti-scatter grid 500 including one or more anti-scatter grid modules may include a plate with an offset angle that is about 0 degree. As an example, a focused anti-scatter grid may include the plates 506 arranged approximately parallel to the primary radiation beams emitted from the radiation source. The plates 506 may be arranged with specific offset angles such that the plates 506 may focus toward a focused point. The focused point may be located at the location of the radiation source such that the plates 506 may be parallel to the primary radiation beams passing the interspaces corresponding to the respective plates.

In some embodiment, the interspace d between adjacent plates may be different from the top of the anti-scatter grid module to the bottom of the anti-scatter grid module, such as the interspace $d_1$ and the interspace $d_2$. In some embodiments, the adjacent plates from the plates may be parallel such that the interspace between the adjacent plates from the top of the anti-scatter grid module 500 to the bottom of the anti-scatter grid module 500 may be same. In some embodiments, the interspace d may be in a range of about 50 μm to about 300 μm.

In some embodiments, the two outer walls of the anti-scatter grid module 500 may be the plates (e.g., the plate 506a and the plate 506d). In some embodiments, at least one of the two outer wall of the anti-scatter grid module may be formed by a poorly absorbing material as described elsewhere in the disclosure.

The first board 502a, the third board 502c and the interlayer board 504 may attach to a portion of the plates 506. The plates 506 may be fixed in precision positions such as plate 506a fixed with the offset angle $θ_1$.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the second plate 504 may be added to the anti-scatter grid module based on bond, weld, rivet, or the like, or a combination thereof. However, those variations and modifications do not depart the scope of the present disclosure.

Figure 6:
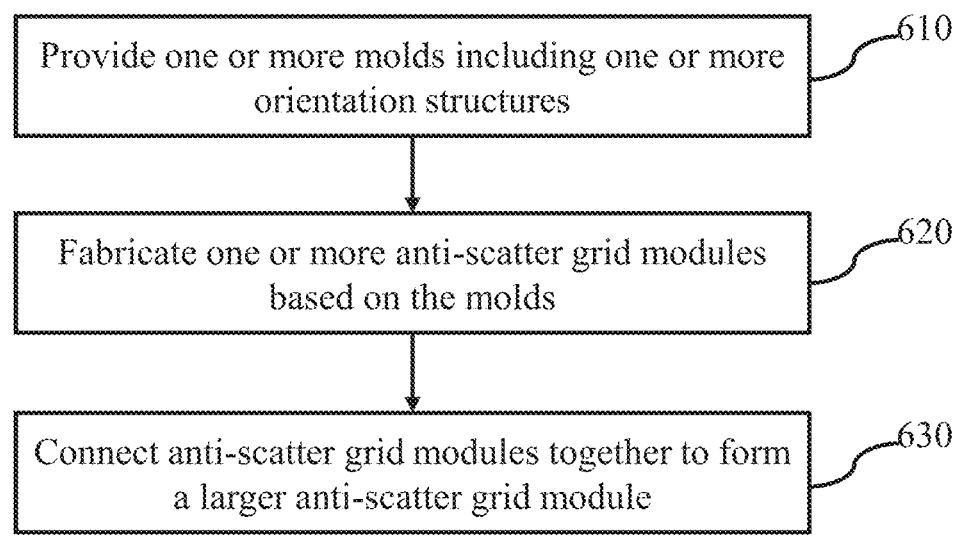
FIG. 6 illustrates a process for fabricating an anti-scatter grid module array according to some embodiments of the present disclosure.

FIG. 6 illustrates a process 600 for fabricating an anti-scatter grid module array according to some embodiments of the present disclosure. The process 600 may be executed to fabricate an anti-scatter grid module array used in the imaging system 100. For example, the process may be stored in a storage device (e.g., the storage 112) in the manner of executable instructions which can be executed to fabricate an anti-scatter grid module array as described in, e.g., FIGS. 2, 3A, 4A, and 5A.

In 610, one or more molds may be provided. Each of the molds may include one or more orientation structures. The orientation structures may be configured to accommodate one or more plates substantially absorbent of radiation (e.g., the plate 506). In some embodiments, the orientation structures may include one or more slots that can fix inserted plates in place. The orientation structures in a mold may be defined by structure related parameters, such as the interspace between adjacent orientation structures, the direction of the orientation structures that determines the offset angle of a plate, the number of the orientation structures, or the like, or a combination thereof. In some embodiments, the structure related parameters of different molds may be the same. For example, the interspace between adjacent orientation structures in multiple molds may be the same. As another example, the number of the orientation structures in multiple molds may be the same. In some embodiments, the structure related parameters of different molds may be different. For example, the direction of the orientation structures that determines the offset angle of a plate may be different. Specifically, the direction of the orientation structures in a mold may be correlated with the position of the mold with respect to other molds.

In 620, one or more grid modules may be fabricated based on the molds. In some embodiments, at least one of the anti-scatter grid modules may include one or more plates made of a highly absorbing material that can absorb at least one type of radiation as described elsewhere in the disclosure. The fabrication of the anti-scatter grid modules may be realized by an injection molding process. For illustration purpose, during the injection molding process, the plates may be placed in one of the molds, wherein one plate is fixed by two adjacent orientation structures. Then, a poorly absorbing material may be injected into the mold through an injection port. After the poorly absorbing material is hardened, the plates are fixed, which may be further separated from the orientation structures in the mold.

In 630, one or more anti-scatter grid modules may be connected to form an anti-scatter grid module array. In some embodiments, the connection between two anti-scatter grid modules may be achieved by bonding, welding, etc. The bonding may include connecting the outer walls of two anti-scatter grid modules by an adhesive layer made of a poorly absorbing material or suitable material substantially non-absorbent of radiation, such as resin, rubber, or the like, or a combination thereof. The resin may include epoxy resin, phenolic resin, polyurethane, polystyrene, polyacrylate, ethylene-vinyl acetate copolymer, vinyl acetate resin, acrylic resin, etc. The rubber may include butyl rubber, chlorinated rubber, nitrile rubber or the like. The welding may connect the outer walls of two anti-scatter grid modules by welding material, such as thermoplasticity material. Thermoplasticity material may include a poorly absorbing material such as resin, rubber, or the like. In some embodiments, one or more coupling structures may be used to connect two anti-scatter grid modules by, for example, one or more rivets, screws, bolts, pins joints, key joints, and/or any other coupling structure.

In some embodiments, both the two side walls of an anti-scatter grid module may be formed by a plate, such that the adjacent anti-scatter grid modules may be connected by bonding two plates via a glue layer. In some embodiments, one side wall of an anti-scatter grid may be formed by a plate and the other side wall of the anti-scatter grid may be formed by a resin layer, such that the adjacent anti-scatter grid modules may be connected by bonding a plate and a resin layer via a glue layer.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the anti-scatter grid modules may be fabricated by one or more molds at different times. However, those variations and modifications do not depart the scope of the present disclosure.

Figure 7A:
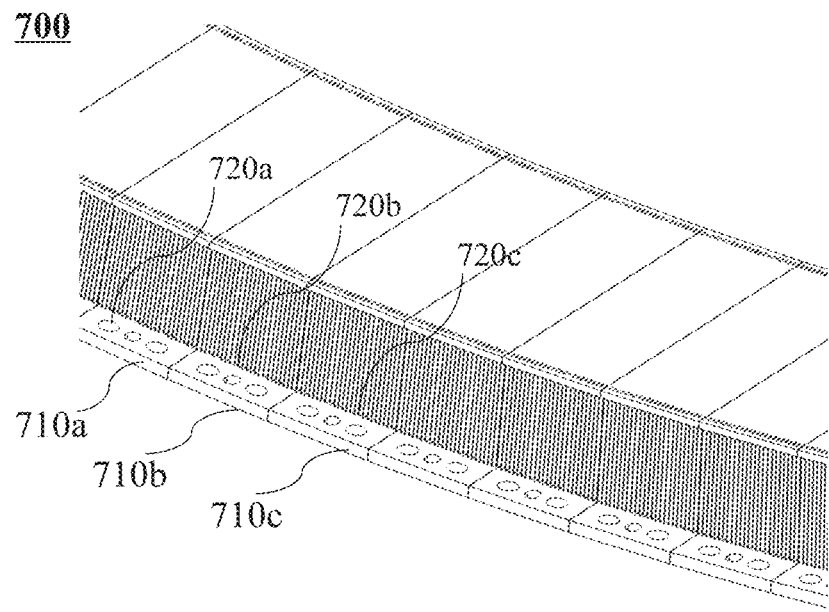
FIG. 7A is a perspective view of an anti-scatter grid module array including a plurality of anti-scatter grid modules according to some embodiments of the present disclosure.

FIG. 7A is a perspective view of an anti-scatter grid module array including a plurality of anti-scatter grid modules according to some embodiments of the present disclosure. As shown, the anti-scatter grid module array 700 may include one or more anti-scatter grid modules, such as an anti-scatter grid module 710a, an anti-scatter grid module 710b, an anti-scatter grid module 710c, etc. Each anti-scatter grid module may include at least one mounting part (e.g., a mounting part 720a, a mounting part 720a, a mounting part 720a, etc.). The mounting part may be used to assemble an anti-scatter grid module (e.g., the anti-scatter grid module 710a) on a substrate (e.g., a detector array) or with another anti-scatter grid module (e.g., the anti-scatter grid module 710b). In some embodiments, the connections between the two anti-scatter grid modules may be achieved by bonding, welding, etc., as illustrated in 630. In some embodiments, the connection between the two anti-scatter grid modules may be achieved by utilizing one or more rivets, screws, bolts, pins joints, key joints, and/or any other coupling structure. As another example, the two anti-scatter grid modules may be attached via a glue layer. The glue layer may be distributed between the two adjacent anti-scatter grid modules uniformly to keep the adjacent anti-scatter grid modules contact as close as possible. In some embodiments, the anti-scatter grid modules may be fixed on a baseboard without bonding to or attaching to each other.

In some embodiments, some of the anti-scatter grid modules may be connected via different methods. For example, the anti-scatter grid module 710a may be connected to the anti-scatter grid module 710b by bonding, while the anti-scatter grid module 710b may be connected to the anti-scatter grid module 710c by welding. In some embodiments, the anti-scatter grid modules may be connected to a substrate via the mounting part 720 associated with each anti-scatter grid module.

The anti-scatter grid module array may be parallel, focused, arc, linear or the like. In some embodiments, the anti-scatter grid module array may be a parallel anti-scatter grid module array when the plurality of anti-scatter grid modules are parallel connected to each other. Furthermore, each anti-scatter grid module may include one or more plates as described elsewhere in the disclosure with zero offset angle. In some embodiments, the anti-scatter grid module array may be a focused anti-scatter grid module array when the anti-scatter grid modules are focused anti-scatter grid modules. The focused anti-scatter grid modules may be in the same configuration or different configurations. For example, the focused anti-scatter grid modules in the same configuration may be connected to form an arc anti-scatter grid array as shown in FIG. 7A. As another example, the focused anti-scatter grid modules in different configurations may be connected to form a liner anti-scatter grid array (e.g., the anti-scatter grid array 206 shown in FIG. 2).

Figure 7B:
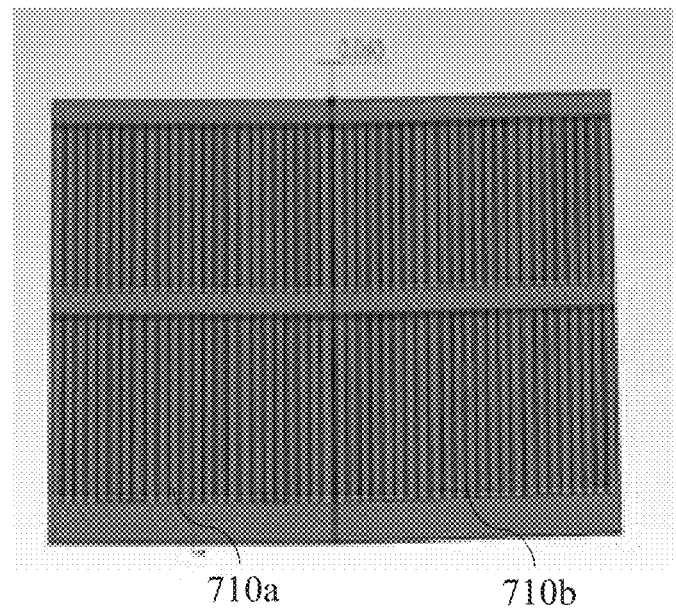
FIG. 7B is a sectional view of an anti-scatter grid array including a plurality of anti-scatter grid modules according to some embodiments of the present disclosure.

FIG. 7B is a sectional view of an anti-scatter grid array including a plurality of anti-scatter grid modules according to some embodiments of the present disclosure. As shown in the figure, the anti-scatter grid module 710a is attached to the anti-scatter grid module 710b. The two attached side walls of anti-scatter grid module 710a and anti-scatter grid module 710b may be both formed by a highly absorbing material that can absorb at least one type of radiation to enable a close attachment. Alternatively, one of the two attached side walls may be formed by a highly absorbing material, and the other one may be formed by a poorly absorbing material (e.g., a resin layer).

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the plurality of anti-scatter grid modules may be positioned on a substrate which may restrict the movement of each anti-scatter grid module at a certain position. However, those variations and modifications do not depart the scope of the present disclosure.

Figure 8:
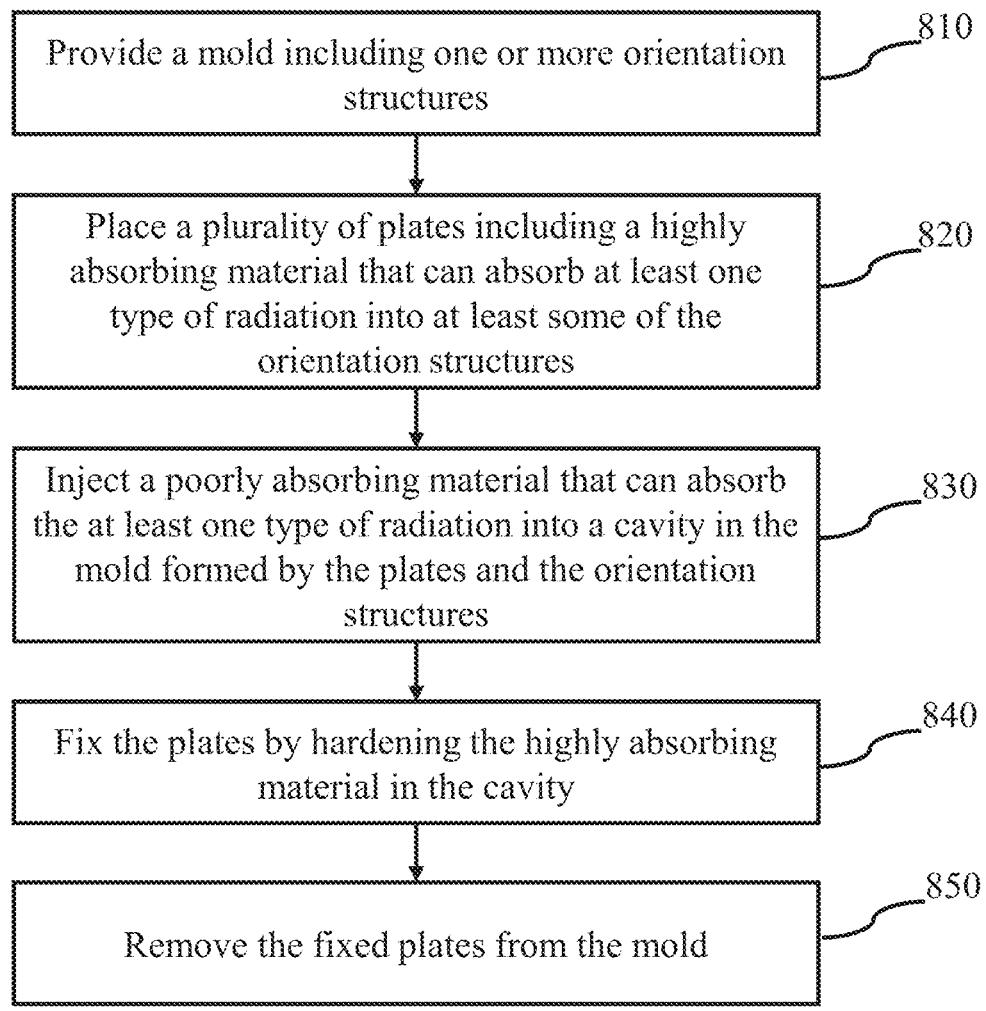
FIG. 8 illustrates a process for fabricating an anti-scatter grid module according to some embodiments of the present disclosure.

FIG. 8 illustrates a process 800 for fabricating an anti-scatter grid module according to some embodiments of the present disclosure. Process 800 may be executed to fabricate an anti-scatter grid used in the imaging system 100. For example, the process may be stored in a storage device (e.g., the storage 112) in the manner of executable instructions which can be executed to fabricate an anti-scatter grid module as described in, e.g., FIGS. 2, 3A, 4A, and/or 5A.

In 810, a mold including one or more orientation structures may be provided. The orientation structures may be arranged in first positions in the mold. In some embodiments, the first positions may be determined based on an offset angle of each orientation structure or an interspace between each two adjacent orientation structures. The orientation structures may constrain a plurality of plates (e.g., the plate 506) in the mold as described elsewhere in the disclosure. For example, the orientation structures may include one or more slots that can constrain the inserted plates. In some embodiments, the first positions of the orientation structures may be adjusted according to a specific condition. For example, some of the orientation structures may be removed from the mold when a larger interspace between adjacent orientation structures is needed. In some embodiments, some of the orientation structures may be adjusted to provide offset angles for the plates that may be fixed.

In some embodiments, the orientation structures may be arranged for compensating the deviation of the first positions (e.g., the change of the interspace between two adjacent orientation structures) incurred by a specific condition (e.g., the temperature change). For example, the orientation structures may be arranged in the mold for compensating the change of the interspace between two adjacent orientation structures when the mold is cooled. In some embodiments, the change of the interspace may be compensated based on a computer model relating to the property of the subsequently injected the second material or the material of the orientation structures (e.g., shrinkage, anti-strain, etc.).

In 820, one or more plates including a highly absorbing material may be placed into at least some of the orientation structures. In some embodiments, the highly absorbing material can absorb at least one type of radiation (e.g., electromagnetic radiation, particle radiation, x-rays, gamma radiation, alpha radiation, etc.) as described in connection with FIG. 2. The plates may be constrained in the mold in second positions defined by the orientation structures. The second positions may be related to an offset angle of each plate and/or an interspace between two adjacent plates. In some embodiments, the offset angle of each plate or an interspace between two adjacent plates may be determined by the geometry of the imaging system 100 (e.g., the location of the radiation source with respect to the anti-scatter grid module array). For example, the offset angle may relate to a path of the radiation beam emitted from a radiation resource to an anti-scatter grid module. The plates with the offset angles may be parallel with the primary radiation beams (e.g., the primary radiation beams 210 in FIG. 2) emitted from the radiation source such that the primary radiation beams may pass through the anti-scatter grid module and be detected by a detector array.

In some embodiments, the second positions may be adjusted based on the first positions of the orientation structures. For example, the offset angle of a plate (e.g., the offset angle of the plate 1108b in FIG. 11) may be decreased by reducing the offset angles of the adjacent orientation structures 1110a, 1110b and 1110c, 1110d. As another example, the interspace between two plates (e.g., the interspace $d_1$ in FIG. 11) may be increased by increasing the width of an orientation structure located in the interspace (e.g., the width of the orientation structure 1110c in FIG. 11).

In some embodiments, all the plates may be placed into the mold after the orientation structures are arranged in the mold. In some embodiments, the plates may be placed into the mold with the orientation structures together.

In 830, a poorly absorbing material may be injected into a cavity of the mold formed by the plates and the orientation structures. In some embodiments, the poorly absorbing material may allow the at least one type of radiation to pass as described in connection with FIG. 2. In some embodiments, the type of radiation that is absorbed by the poorly absorbing material is same with the type of radiation that is absorbed by the highly absorbing material as described elsewhere in the disclosure. In some embodiments, the phase state of the poorly absorbing material may be changed according to the change of temperature. For example, the phase state of the poorly absorbing material may change from a solid state to a molten state (e.g., a fluid state) when the temperature is heated above a critical point. The molten poorly absorbing material may be injected into the first cavity in the mold. In some embodiments, the poorly absorbing material may be injected into the first cavity located at the boundary defined by the plurality of plates. In a specific example, the first cavity may be located around the perimeter of the plurality of plates (see, e.g., the first interspace 1106a or the third interspace 1106c in FIG. 11). In some embodiments, the poorly absorbing material may be injected into the first cavity located within a portion of the interspace of the plates (see, e.g., the second interspace 1106c in FIG. 11).

In 840, the plates may be fixed in second positions by hardening the poorly absorbing material in the cavity. In some embodiments, the hardening process may be realized by changing the phase state of the poorly absorbing material from a molten state (e.g., a fluid state) to a solid state via, for example cooling until the temperature is below a critical point. The hardened poorly absorbing material in the first cavity may fix the plates to form an integrated unit when the hardened second material and the plates are separated from the orientation structures.

In 850, the fixed plates may be removed from the mold. When the plates are removed from the mold with the hardening poorly absorbing material together, the plates may be separated from the orientation structures. Then the poorly absorbing material may substitute the orientation structures to fix the plates in the second positions. In some embodiments, the removed plates that are fixed by the hardened poorly absorbing material may form an anti-scatter grid module as described elsewhere in the disclosure. In some embodiments, the removed plates that are constrained by the hardened poorly absorbing material may connect to one or more anti-scatter grid modules to form a large anti-scatter grid module.

In some embodiments, the anti-scatter grid module as described in 850 may be added to a board to form a surface of the anti-scatter grid module. For example, the board may be located at the front of the anti-scatter grid module (e.g., the fourth board 404 in FIG. 4A). As another example, the board may be located at the top of the anti-scatter grid module (e.g., the first board 402a in FIG. 4A). The board may include a poorly absorbing material as described in connection with FIG. 2.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the anti-scatter grid module as described in 850 may be added to a mounting part (e.g., the mounting part 303 in FIG. 3A) to assemble the anti-scatter grid module to a detector or connect two anti-scatter grid modules. However, those variations and modifications do not depart the scope of the present disclosure.

Figure 9:
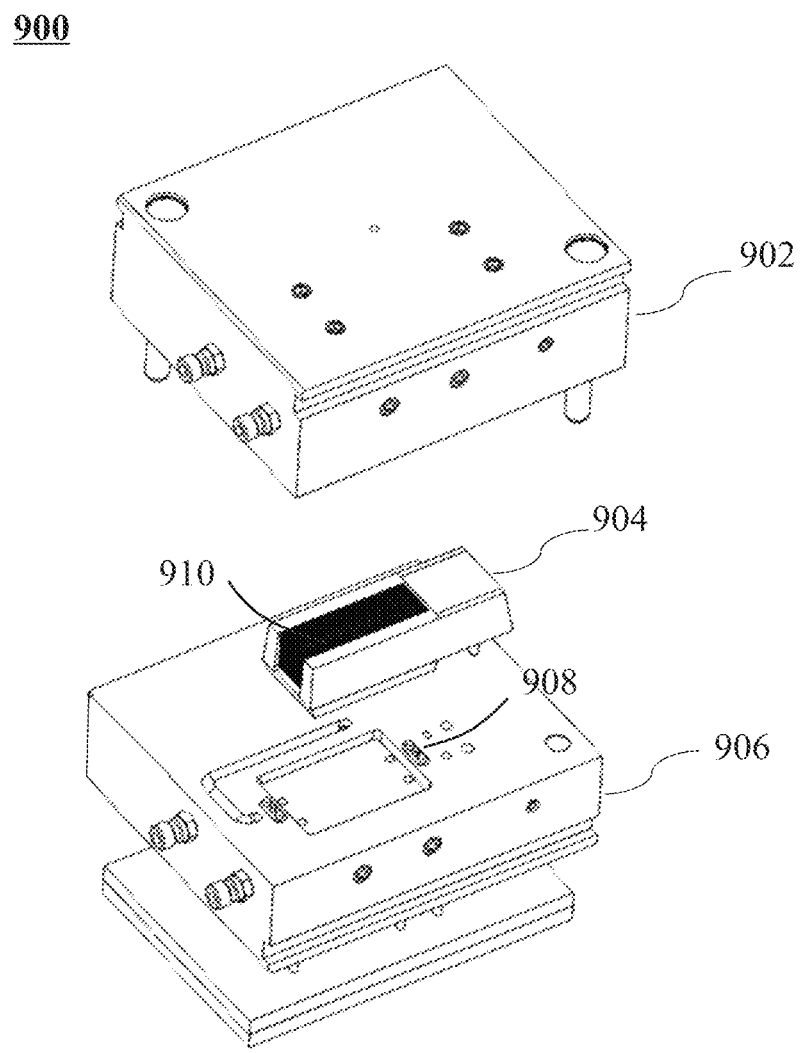
FIG. 9 illustrates a perspective view of an exemplary anti-scatter grid mold according to some embodiments of the present disclosure.

FIG. 9 illustrates a perspective view of an exemplary anti-scatter grid mold 900 according to some embodiments of the present disclosure. As shown, the mold 900 may include a first part 902 (also referred to as "a lid"), a second part 904 (also referred to as "a container"), and a third part 906 (also referred to as "a baseplate"). In some embodiments, the different parts of the mold may be connected to each other by one or more bolts, pin joints, key joints, rivets, etc. The mold 900 may be used to fabricate an anti-scatter grid module as described elsewhere in the disclosure.

Figure 11:
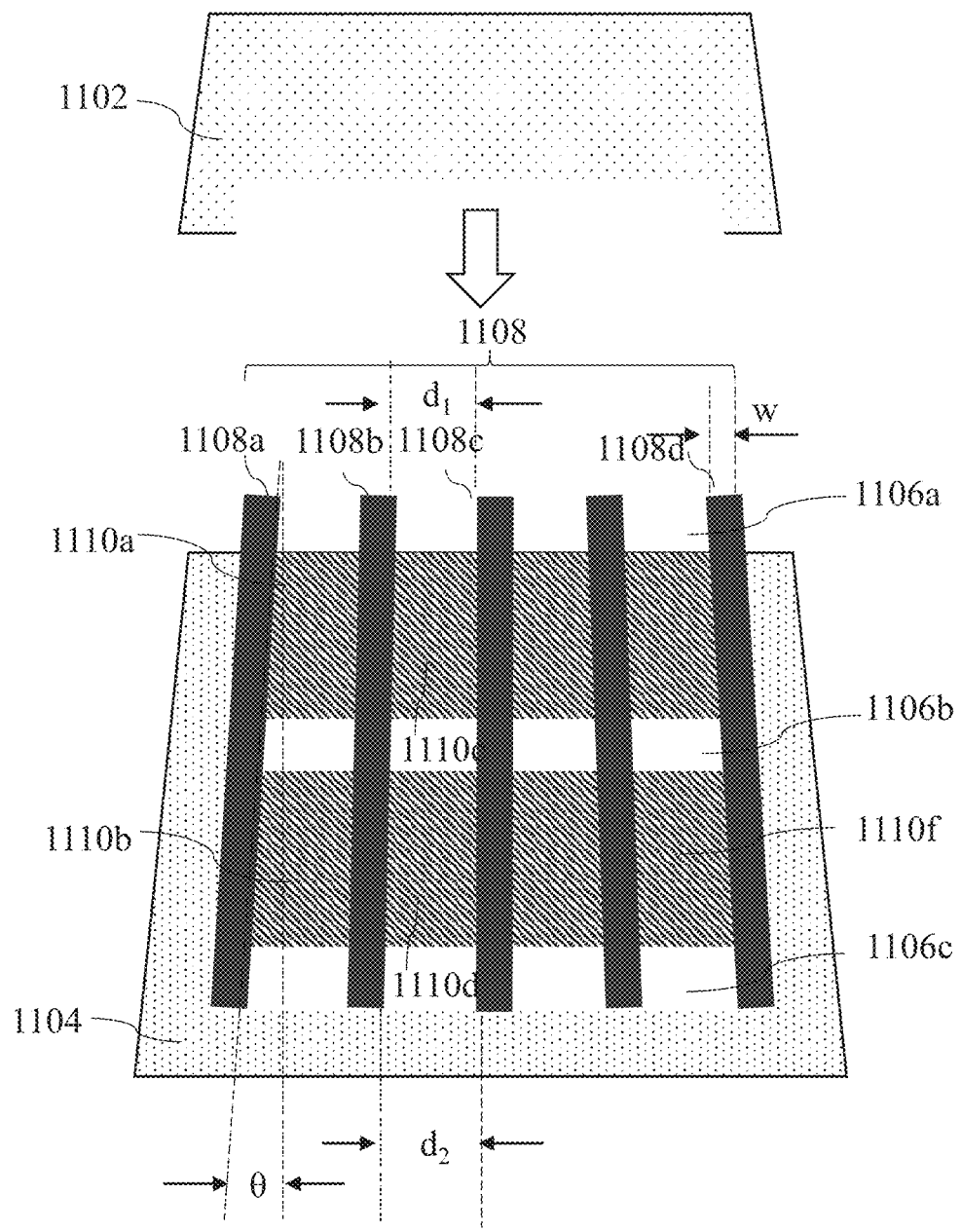
FIG. 11 illustrates a sectional view of an exemplary second part of a mold with a plurality of plates as illustrated in FIG. 10B according to some embodiments of the present disclosure.

The first part 902 may be placed on the second part 904 and the third part 906. The first part 902 may constrain the top or side shape or volume of the anti-grid scatter grid module (e.g., the first board 302*a* in FIG. 3A). For illustration purpose, when the first part 902 is placed onto the second part 904, a cavity (e.g., the first interspace 1106*a* as shown in FIG. 11) may be formed between the second part 904 and the first part 902. The hardened poorly absorbing material as described elsewhere injected into the cavity may form the top or side shape of the anti-grid scatter grid module (e.g., the first board 302*a* in FIG. 3A). The shape and volume of the cavity may be determined based on the configuration of the first part 902 and/or the second part 904.

The second part 904 may include one or more orientation structures 910. The orientation structures 910 in the mold may be arranged based on the type of an anti-scatter grid module array applied in the imaging system 100. For example, for a parallel anti-scatter grid module array, the orientation structures 910 may be arranged in the mold parallel to each other. In some embodiments, some of the orientation structures 910 may be removed from the second part 904. In some embodiments, the positions of the orientation structures 910 in the mold may be adjustable. In some embodiments, the orientation structures 910 may be an integral part of the second part 904.

The third part 906 may support the second part 904. In some embodiments, the third part 906 may include a mounting region 908. The mounting region 908 may form a mounting part of an anti-scatter grid module (e.g., the mounting part 303 in FIG. 3A) for the assembly of the anti-scatter module on a substrate with a detector array. In some embodiments, the mounting region 908 may be a cylinder embossment with thread structures corresponding to thread holes (e.g., the mounting part 303 in FIG. 3A) in an anti-scatter grid module.

In some embodiments, the fluidic material may be injected into the cavity through an injection port located in the first part 902, the second part 904, and/or the third part 906.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the second part 904 and the third part 906 may be integrated into one single part. In some embodiments, the mounting region 908 may be unnecessary. However, those variations and modifications do not depart the scope of the present disclosure.

Figure 10A:
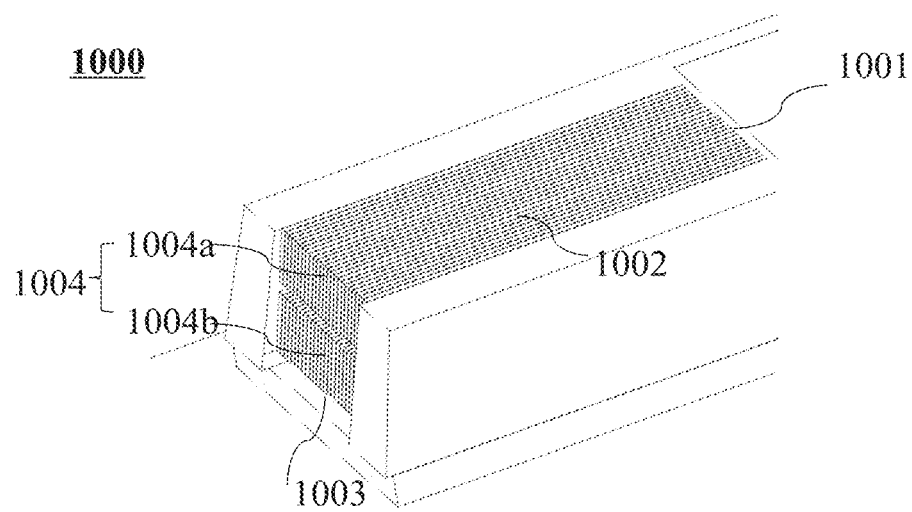
FIG. 10A illustrates a perspective view of an exemplary second part of a mold according to some embodiments of the present disclosure.

FIG. 10A illustrates a three-dimensional view of an example second part of a mold according to some embodiments of the present disclosure. As shown in the figure, a second part 1000 may include one or more orientation structures 1004. The orientation structures 1004 may constrain one or more plates in the mold. The orientation structures 1004 may include one or more slots. In some embodiments, one side boundary (e.g., the side boundary 1001) defined by the orientation structures 1004 may be connected with the second part 1000 by welding. In some embodiments, the connection between the orientation structures 1004 and the second part 1000 may be achieved by utilizing one or more rivets, screws, or any other coupling structure, or the like, or a combination thereof. In some embodiments, the orientation structures 1004 and the second part 1000 may be connected based on a unibody design.

In some embodiments, the orientation structures 1004 may be arranged in two lines including the upper line 1004*a* and the lower line 1004*b*. In some embodiments, the upper line 1004*a* and the lower line 1004*b* may be connected to form one line. In some embodiments, the orientation structures 1004 may be arranged in more than two lines.

In some embodiments, the offset angle of each orientation structure 1004 in the mold may be adjusted according to different types of anti-scatter grid modules. For example, for a parallel anti-scatter grid module, the offset angles of the orientation structures 1004 may be adjusted to 0 degree in the mold. For a focused anti-scatter grid module, the offset angles of the orientation structures 1004 may be adjusted from 0 degree to a suitable degree such as 15 degrees in the mold. In some embodiments, the number of orientation structures 1004 may be increased or decreased based on the number of the plates in the anti-scatter grid module. As another example, the interspace between two adjacent orientation structures may be increased to adapt a plate with a greater width. In some embodiments, the shape of orientation structures 1004 may be a rectangle, a parallelogram, a trapezoid, or another irregular shape.

Figure 10B:
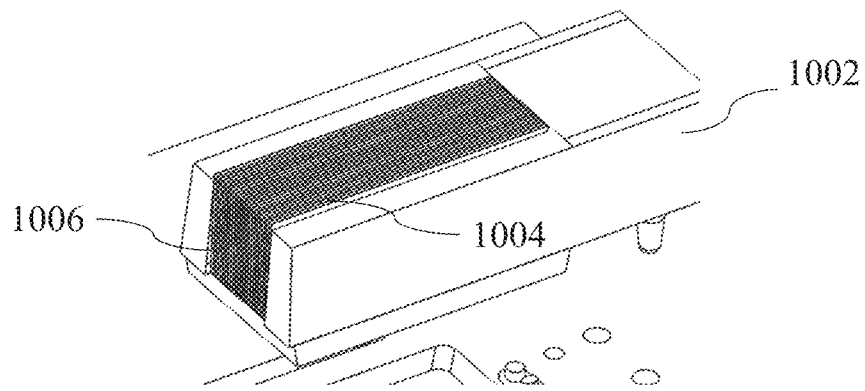
FIG. 10B illustrates a perspective view of an exemplary second part of a mold with a plurality of plates according to some embodiments of the present disclosure.

FIG. 10B illustrates a three-dimensional view of an example second part of a mold with a plurality of plates according to some embodiments of the present disclosure. As illustrated in FIG. 10B, one or more of plates 1006 may be placed into the orientation structures 1004 in FIG. 10A. The plates 1006 may contact respectively with the orientation structures 1004 such that the plates 1006 may be fixed in precision positions. The plates 1006 may protrude out the orientation structures 1004 at the top boundary, one side boundary or the bottom boundary defined by the plates 1006. The plates 1006 may contact with the bottom of the second part 1002. The interspace between the inner wall of the second part 1002 and the outmost layer of the orientation structures 1004 may be placed on a plate.

In some embodiments, the bottom boundary of the plates 1006 may be apart from the bottom of the second part 1002. In some embodiments, the top boundary of the plates 1006 may be flush with the orientation structures 1004.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, there may be a plurality of grooves at the bottom of the second part 1002, and the plates may be placed into the plurality of grooves directly. However, those variations and modifications do not depart the scope of the present disclosure.

FIG. 11 illustrates a sectional view of an example second part of a mold with a plurality of plates as illustrated in FIG. 10B according to some embodiments of the present disclosure. The second part 1104 of the mold may include one or more orientation structures arranged in two lines (e.g., an upper line with orientation structures 1110*a*, 1110*c* and a lower line with orientation structures 1110*b*, 1110*d*). In some embodiments, the upper line of orientation structures may be flush with the second part 1104, and the lower line is apart from the bottom of the second part 1104. When the first part 1102 of the mold is placed onto the second part 1104, a first interspace 1106*a* may be formed between the upper line of orientation structures and the first part 1102. A second interspace 1106b may be formed between the upper line of orientation structures and the lower line of orientation structures. A third interspace 1106c may be formed between the lower line of the orientation structures and the bottom of the second part 1104.

The plates 1108 (e.g., a plate 1108a, a plate 1108b, a plate 1108c and a plate 1108d) including a highly absorbing material as described elsewhere in the disclosure may be placed into the orientation structures. The plates may protrude out the orientation structures and contact with the bottom of the second part 1104.

When the mold is closed, the first interspace 1106a, the second interspace 1106b, and the third interspace 1106c may be in fluidic communication with each other to form a cavity in the mold. The cavity may be injected with a second material, such as resin as described elsewhere in the disclosure. The hardened second material fixes the plates in positions when the plates are separated from the orientation structures. The hardened poorly absorbing material in the cavity may form one surface or an interlayer board of the anti-scatter grid module. For example, the hardened poorly absorbing material in the first interspace 1110a may form a first board of the anti-scatter grid module (e.g., the first board 302a in FIG. 3A). For example, the hardened poorly absorbing material in the third interspace 1110c may form a third board of the anti-scatter grid module (e.g., the third board 302c in FIG. 3A). As another example, the hardened poorly absorbing material in the second interspace 1110b may form an interlayer board of the anti-scatter grid module (e.g., the interlayer board 504 in FIG. 5A).

As shown in the figure, the inner walls of the second part 1104 may attach to the plate 1108a and the plate 1108d. Alternatively, the inner walls of the second part 1104 may contact with the orientation structures.

The plates may be constrained in the mold by the orientation structures. For example, the plate 1108a may be constrained by the orientation structure 1110a and the orientation structure 1110b. The plate 1108b may be constrained by the orientation structure 1110a and the orientation structure 1110c, or the orientation structure 1110b and the orientation structure 1110d. The interspace $d_1$ between the plate 1108b and the plate 1108c may be determined based on the width of orientation structure 1110c. The interspace $d_2$ between the plate 1108b and the plate 1108c may be determined based on the width of orientation structure 1110d. The offset angle $\theta$ of the plate 1108a may be determined based on the offset angles of the orientation structure 1110a and the orientation structure 1110b.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the second interspace 1106b may be omitted from the mold. As another example, the orientation structures may be arranged in more than two lines. In some embodiments, the lower line of orientation structures may contact with the bottom of the second part 1104 such that the third interspace may not be formed. However, those variations and modifications do not depart the scope of the present disclosure.

Figure 12A:
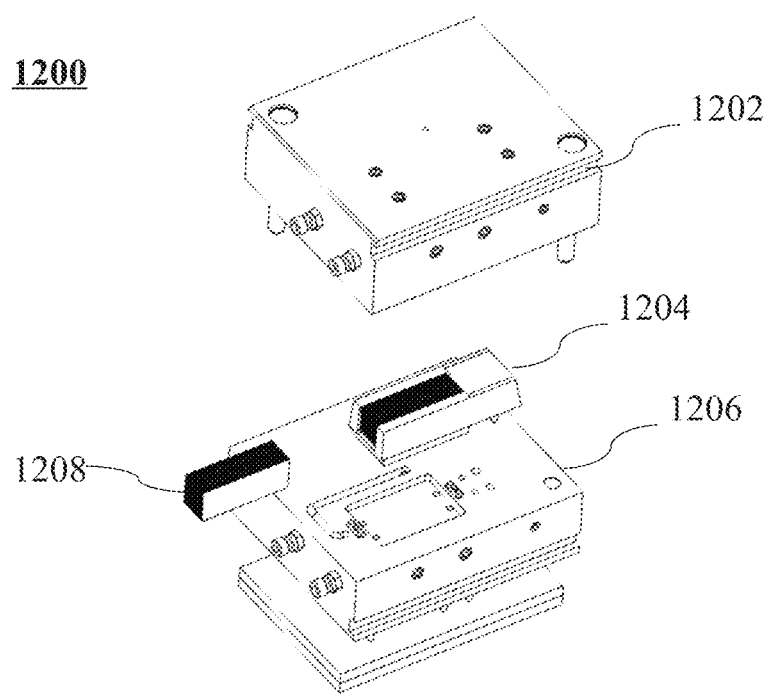
FIGS. 12A-12D are perspective views illustrating a process for making an anti-scatter grid module by a mold according to some embodiments of the present disclosure.
Figure 12B:
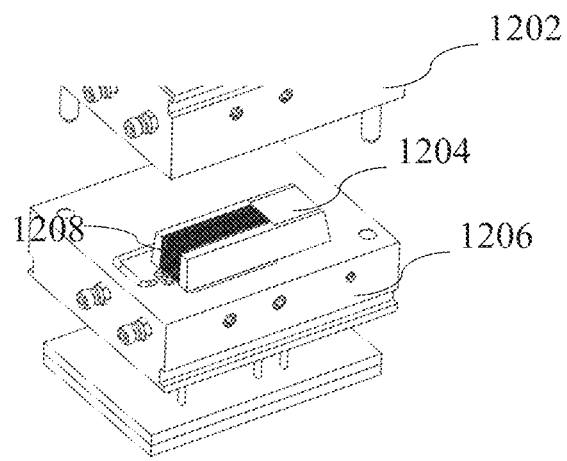
Figure 12C:
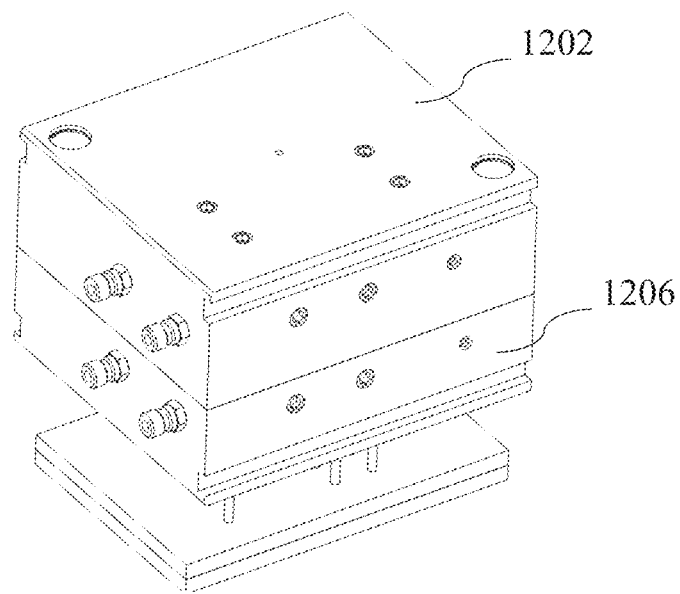
Figure 12D:
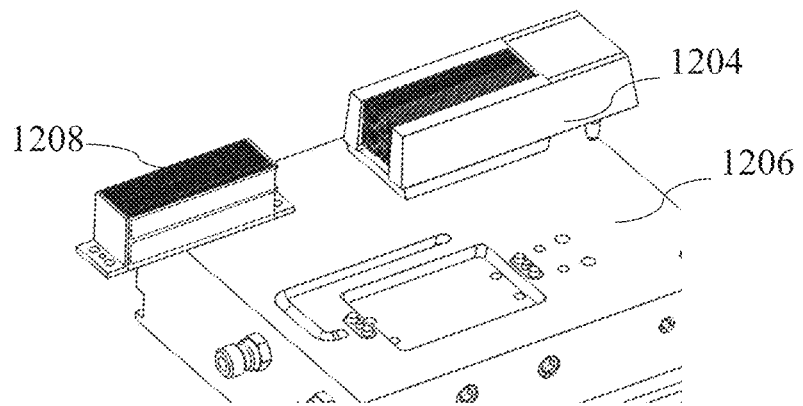

FIG. 12A-12D are three-dimensional views illustrating a process 1200 for making an anti-scatter grid module by a mold according to some embodiments of the present disclosure. The process 1200 for fabricating an anti-scatter grid may include: placing a plurality of plates 1208 as described elsewhere in the disclosure into a second part 1204; constraining the plates 1208 in the second part 1204 as shown in FIG. 12A; placing the second part 1204 with the plates 1208 onto a third part 1206 of the mold as shown in FIG. 12B; placing a first part 1202 onto the assembly of the second part 1204 and a third part 1206 as shown in FIG. 12C; injecting a poorly absorbing material as described elsewhere in the disclosure into the mold to fill a cavity in the mold; separating the plates 1208 and the poorly absorbing material from the mold, specifically, the second part 1204, after the poorly absorbing material is hardened as shown in FIG. 12D.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the second part 1204 and the third part 1206 may be integrated into one part and the process of placing the second part 1204 on the third part 1206 may be omitted. However, those variations and modifications do not depart the scope of the present disclosure.

It should be noted that the above description of the embodiments are provided for the purposes of comprehending the present disclosure, and not intended to limit the scope of the present disclosure. For persons having ordinary skills in the art, various variations and modifications may be conducted in the light of the present disclosure. However, those variations and the modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python. Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

It is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for fabricating an anti-scatter grid module, the method comprising:
   providing a mold comprising a plurality of orientation structures fixed therein and a mounting region, wherein the plurality of orientation structures are arranged in first positions;
   placing a plurality of plates including a first material into at least one of the plurality of orientation structures, wherein the first material is capable of absorbing a first amount of at least one type of radiation, and wherein the plurality of plates are constrained in second positions by the plurality of orientation structures such that the plurality of plates are arranged in a manner that each plate is oriented at an offset angle relative to a path of a radiation;
   injecting a second material into a first cavity in the mold to form at least a top board, a bottom board, a back or front board connecting the top and the bottom boards, and a mounting part at the mounting region, wherein the second material is capable of absorbing a second amount of the at least one type of radiation, and wherein the first amount is greater than the second amount;

separating, after the second material is hardened, the plurality of plates and the hardened second material from the mold including the orientation structures to generate a first module, wherein the hardened second material forms the mounting part at the mounting region for assembly of the first module on a substrate with a detector array and the top, bottom, back or front board for holding the plurality of plates such that the plurality of plates remain arranged in the manner that each plate is oriented at the offset angle relative to the path of the radiation with interspaces between the plates.

2. The method of claim 1, wherein the second material comprises resin.

3. The method of claim 1, wherein the second material comprises a composite material including a third material capable of absorbing a third amount of the at least one type of radiation, wherein the first amount is greater than the third amount.

4. The method of claim 1, further comprising adding a layer to a surface of the first module without the second material, the layer comprising a fourth material capable of absorbing a fourth amount of the at least one type of radiation, wherein the fourth amount is less than the first amount.

5. The method of claim 1, further comprising generating a second module using the method of claim 1 and connecting the first module with the second module.

6. The method of claim 5, wherein the first module is bound to the second module via at least one of the plurality of plates.

7. The method of claim 1, wherein the second material further forms an outer wall in addition to the boards to hold the plurality of plates in place.

8. The method of claim 1, wherein the second material further forms an interlayer board that is configured, in addition to the top, bottom, back or front board, to hold the plurality of plates in place.

9. A mold for fabricating an anti-scatter grid module, comprising:
a first part and a second part;
the second part comprising a plurality of orientation structures and a mounting region, wherein
the plurality of orientation structures are arranged in first positions and configured to be used to constrain a plurality of plates in second positions such that each plate is oriented at an offset angle relative to a path of a radiation, the plurality of plates being part of the anti-scatter grid module, and each of the plurality of plates being fixed by two of the plurality of orientation structures that are adjacent to the each plate,
a first cavity for forming a structure upon injection and hardening of a material, wherein at least part of the first cavity is formed by the plurality of plates and the plurality of orientation structures, the hardened material in the structure is configured to constrain the plurality of plates, and the structure comprising
a mounting part formed at the mounting region for assembly of a first module on a substrate with a detector array and at least a top board, a bottom board, a back or front board connecting the top and the bottom boards.

10. The mold of claim 9, wherein the plurality of orientation structures comprises an upper portion and a lower portion.

11. The mold of claim 9, further comprising a second cavity for forming one or more outer walls of the anti-scatter grid module.

12. The mold of claim 11, wherein the second cavity is capable of fluid communication with the first cavity.

13. The mold of claim 9, further comprising a side boundary connecting the plurality of orientation structures.

14. The mold of claim 9, wherein the plurality of orientation structures comprises a plurality of slots.

15. An anti-scatter grid module, formed by a method comprising:
providing a mold comprising a plurality of orientation structures fixed therein and a mounting region, wherein the plurality of orientation structures are arranged in first positions;
placing a plurality of plates including a first material into at least one of the plurality of orientation structures, wherein the plurality of plates are constrained in second positions by the plurality of orientation structures such that the plurality of plates are arranged in a manner that each plate is oriented at an offset angle relative to a path of a radiation and the first material is capable of absorbing a first amount of the at least one type of radiation;
injecting a second material into a first cavity in the mold to form at least a top board, a bottom board, a back or front board connecting the top and the bottom boards, and a mounting part at the mounting region, wherein the second material is capable of absorbing a second amount of the at least one type of radiation, and wherein the first amount is greater than the second amount;
separating, after the second material is hardened, the plurality of plates and the hardened second material from the mold including the orientation structures to generate the anti-scatter grid module,
wherein the hardened second material forms the mounting part at the mounting region for assembly of the anti-scatter grid module on a substrate with a detector array, and the top, bottom, back or front board for holding the plurality of plates such that the plurality of plates remain arranged in the manner that each plate is oriented at the offset angle relative to a path of the radiation with interspaces between the plates.

16. A multimodule collimator, comprising at least two modules of claim 15 connected to each other.

17. The multimodule collimator of claim 16, wherein the modules are bonded to each other via the plates.

18. The anti-scatter grid module of claim 15, further comprising an outer wall that comprises the second material in addition to the top, bottom, back or front board to hold the plurality of plates in place.

19. The anti-scatter grid module of claim 15, further comprising an interlayer board that is configured, in addition to the top, bottom, back or front board, to hold the plurality of plates in place.

* * * * *